UNITED STATES PATENT OFFICE.

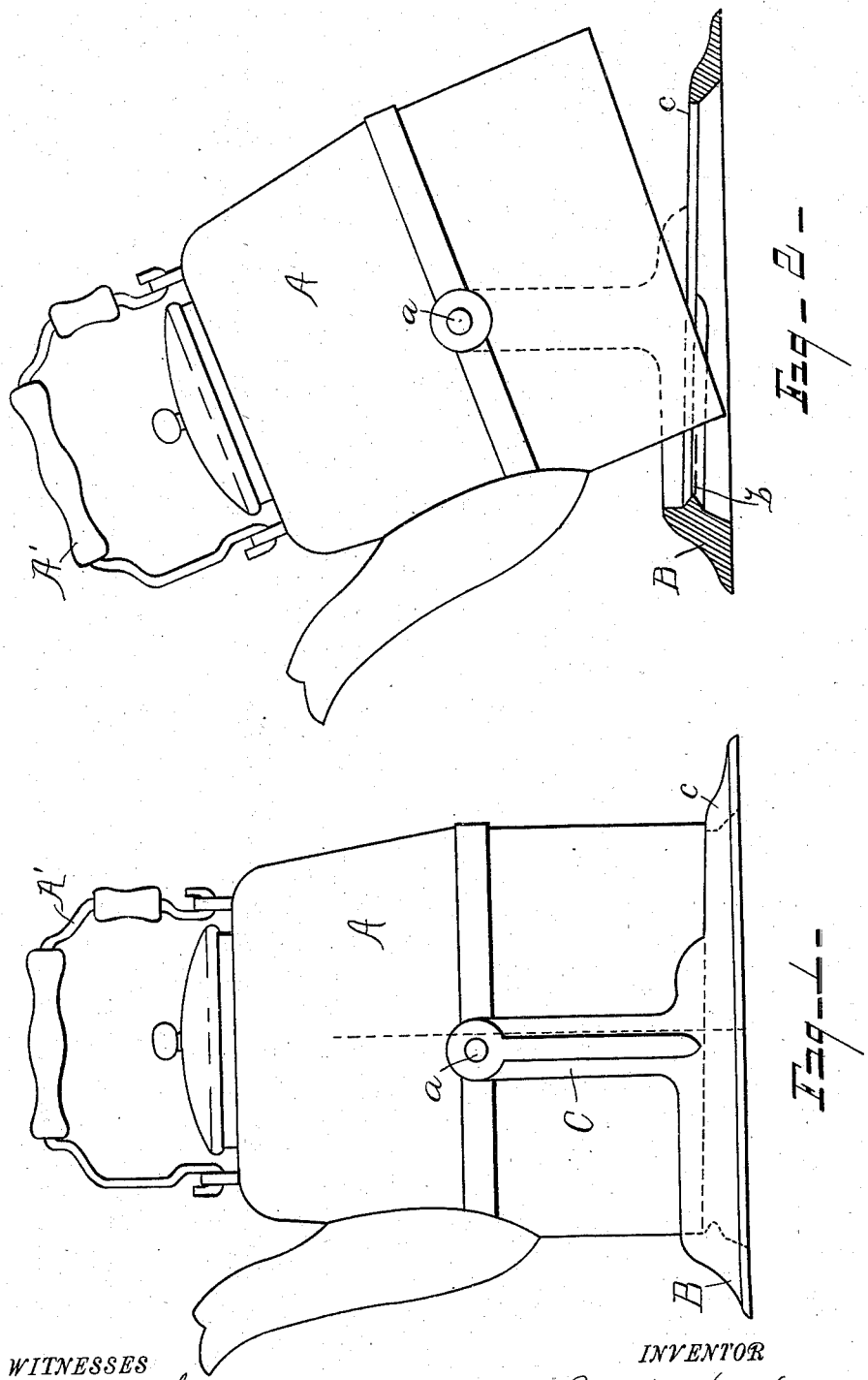

ROBERT KEYS, OF DETROIT, MICHIGAN.

TEA-KETTLE AND ATTACHMENT.

SPECIFICATION forming part of Letters Patent No. 558,079, dated April 14, 1896.

Application filed December 21, 1895. Serial No. 572,843. (No model.)

*To all whom it may concern:*

Be it known that I, ROBERT KEYS, a citizen of the United States, residing at Detroit, in the county of Wayne, State of Michigan, have invented certain new and useful Improvements in Tea-Kettles and Attachments; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to tea-kettles and attachments; and it consists in a certain construction and arrangement of parts hereinafter fully set forth, and pointed out particularly in the claims.

The object of the invention is to provide a tea-kettle from which hot water may be poured without danger of scalding and without lifting the weight of the kettle and its contents, in which the arrangement is such as to provide a firm support for the kettle, which will at the same time expose the entire bottom thereof directly to the heat of the fire, at the same time preventing any escape of gas or smoke from the stove and confining the heat under the bottom of the kettle, which results are attained by the construction illustrated in the accompanying drawings, in which—

Figure 1 is a side elevation of my improved kettle and base upon which it is mounted. Fig. 2 is a like view showing the base in transverse section and the kettle slightly tilted upon its supports.

Referring to the letters of reference, A designates the kettle, which may be of any suitable construction, being provided with a handle A' for lifting said kettle and for tilting it upon its pivot.

B designates an annular base which describes a flaring ring having a large central aperture therethrough and provided on opposite sides with uprights or supports C, between which the kettle is pivoted by means of a pin *a* passing through said uprights and entering a suitable boss on the side of the kettle.

The base B is flat on its under face and is designed to sit upon the surface of the stove around the hole usually closed by the lid. The lid, however, is removed in using this improved device, so that the heat of the fire comes directly in contact with the bottom of the kettle, enabling the contents of the kettle to be more quickly heated and effecting economy in the use of fuel.

In cases where gas or vapor burners are used the base is placed over the burner so as to expose the bottom of the kettle directly to the flame, the heat from which is confined by said base and retained in contiguity with the bottom of the kettle, quickly heating the contents thereof.

As will be seen, the bottom of the kettle is beveled or stands at an angle, its forward edge rising above the plane of its rear edge when in a vertical position, as shown in Fig. 1. This construction permits the forward edge of the kettle to clear any object upon which the base may be seated when the kettle is tipped to pour the contents therefrom, as shown in Fig. 2.

Projecting from the inner face of the base at the front thereof is a beveled flange *b*, over which the forward edge of the kettle is adapted to swing when it assumes an upright position. This flange stands slightly at an angle and in the plane of the rear upper face *c* of the base, upon which the rear edge of the kettle closes, so that through the medium of this flange and the rear edge of the base with which it coincides a tight closure is made around the bottom of the kettle which perfectly excludes all gas and smoke and prevents the escape of heat from under the kettle, which is retained within the chamber formed below the kettle's bottom.

The kettle is pivoted forward of a central vertical line therethrough, so that said kettle will right itself after being tipped in the act of pouring the contents therefrom and will have a tendency to remain closely in contact with the base, which embraces the bottom thereof.

It will now be understood that by means of this improved device the contents of the kettle may be quickly heated and freely and easily discharged therefrom, obviating the liability and danger incident to lifting and carrying the kettle filled with hot or boiling contents.

Having thus fully set forth my invention, what I claim as new, and desire to secure by Letters Patent, is—

1. The combination of the base having a central opening therethrough, the supporting-uprights extending from the base, the vessel pivoted between said uprights its bottom portion embraced by said base which closes around the edge of the vessel and the bottom of the vessel normally closing the central opening through the base.

2. The combination of the annular base describing a flaring ring and having the opposed uprights extending from opposite sides thereof, the vessel pivoted between said uprights having an inclined bottom, a flange extending diametrically from the inner ring of the base at the front thereof which coincides with the upper rear face of said base and which declines rearwardly in a plane with the incline of the bottom of the vessel the forward portion of the edge of which normally closes against the base above said flange and the rear edge of which normally rests upon the upper face of the rear edge of the base, substantially as specified.

In testimony whereof I affix my signature in presence of two witnesses.

ROBERT KEYS.

Witnesses:
B. F. WHEELER,
E. S. WHEELER.